(12) United States Patent
Zhang

(10) Patent No.: US 9,048,718 B2
(45) Date of Patent: Jun. 2, 2015

(54) LINEAR VIBRATOR HAVING POLE PLATE POSITIONED IN WEIGHT THEREOF

(75) Inventor: Yu-Qing Zhang, Shenzhen (CN)

(73) Assignees: AAC ACOUSTIC TECHNOLOGIES (SHENZHEN) CO., LTD., Shenzhen (CN); AMERICAN AUDIO COMPONENTS INC., La Verne, CA (US)

( * ) Notice: Subject to any disclaimer, the term of this patent is extended or adjusted under 35 U.S.C. 154(b) by 404 days.

(21) Appl. No.: 13/472,544

(22) Filed: May 16, 2012

(65) Prior Publication Data

US 2012/0313459 A1 Dec. 13, 2012

(30) Foreign Application Priority Data

Jun. 8, 2011 (CN) .......................... 2011 1 0152560

(51) Int. Cl.
*H02K 33/02* (2006.01)
*H02K 35/02* (2006.01)
*H02K 33/18* (2006.01)

(52) U.S. Cl.
CPC ................ *H02K 33/18* (2013.01); *H02K 33/02* (2013.01)

(58) Field of Classification Search
CPC ....... H02K 33/00; H02K 33/02; H02K 33/06; H02K 33/16; H02K 35/02
See application file for complete search history.

(56) References Cited

U.S. PATENT DOCUMENTS

| 2005/0184601 | A1* | 8/2005 | Kweon et al. ................... 310/14 |
| 2005/0285454 | A1* | 12/2005 | Choi et al. ....................... 310/14 |
| 2010/0213773 | A1* | 8/2010 | Dong et al. ..................... 310/25 |
| 2011/0089772 | A1* | 4/2011 | Dong et al. ..................... 310/25 |
| 2011/0241451 | A1* | 10/2011 | Park ............................... 310/25 |
| 2013/0241321 | A1* | 9/2013 | Akanuma et al. ............... 310/25 |

\* cited by examiner

*Primary Examiner* — Michael Andrews
(74) *Attorney, Agent, or Firm* — Anova Law Group, PLLC

(57) ABSTRACT

A linear vibrator is disclosed. The linear vibrator includes a housing having a base and a cover, a number of elastic members connected to the housing, a vibrating unit suspended in the housing by the elastic members, and a coil positioned in the housing. The vibrating unit includes a pole plate received in a recess formed in the vibrating unit, and a damper positioned on the pole plate by magnetic flux.

8 Claims, 3 Drawing Sheets

LINEAR VIBRATOR HAVING POLE PLATE POSITIONED IN WEIGHT THEREOF

FIELD OF THE INVENTION

The present disclosure generally relates to the art of vibrators and, more particularly, to a linear vibrator having a pole plate positioned in a weight thereof for generating tactile sensation.

DESCRIPTION OF RELATED ARTS

Consumer products, such as mobile phones and portable multi-media players, generally include vibrators for generating tactile feedback. For example, a mobile phone has a vibrator for generating vibration while a call is called in, and a portable multi-media player has a touch screen having vibrators for getting tactile feedback.

A vibrator has a moving unit moving along a linear direction is called linear vibrator. Linear vibrators are widely used in consumer products and are disclosed in U.S. Pat. No. 6,466,682 B2 issued on Oct. 15, 2002, and U.S. Pat. No. 7,099,489 B2 issued on Aug. 29, 2006. The vibrator is mounted on a mounting surface of a printed circuit board, and the moving unit thereof is actuated to move along a direction perpendicular to the mounting surface. However, the movement along the direction perpendicular to the mounting surface increases the height of the vibrator.

In order to solve the problem of increased height, a vibrator having a vibrating unit moving a direction parallel to the mounting surface is designed and developed. As the vibration direction is parallel to the mounting surface, the height of the vibrator is decreased. The vibrator having a parallel vibrating direction is disclosed in US 20110006618 A1 published on Jan. 13, 2011, US 20110012441 A1 published on Jan. 20, 2011, US 20100213773 A1 published on Aug. 26, 2010, and US 20110089772 A1 published on Apr. 21, 2011.

Even though the vibrator has a parallel vibrating direction, while dropped down, the vibrating unit thereof will still move along a direction perpendicular to the vibrating direction. While dropped down, the vibrating unit would crash onto the housing of the vibrator, which results in noise or damage of the vibrating unit or the housing.

So, it is necessary to provide a new vibrator for solving the problems mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF EXEMPLARY EMBODIMENTS

Reference will now be made to describe exemplary embodiments of the present disclosure in detail.

Figure 1:
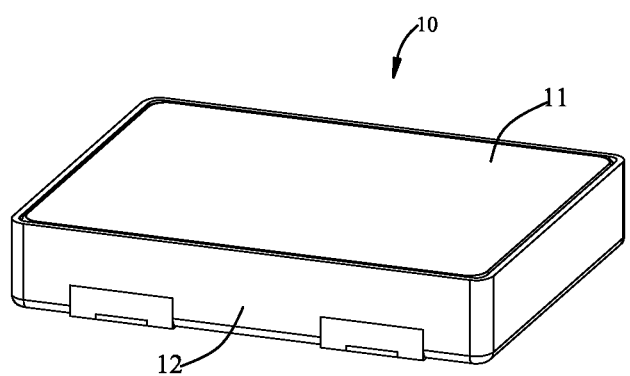
FIG. 1 is an isometric view of a linear vibrator in accordance with an exemplary embodiment of the present disclosure.
Figure 2:
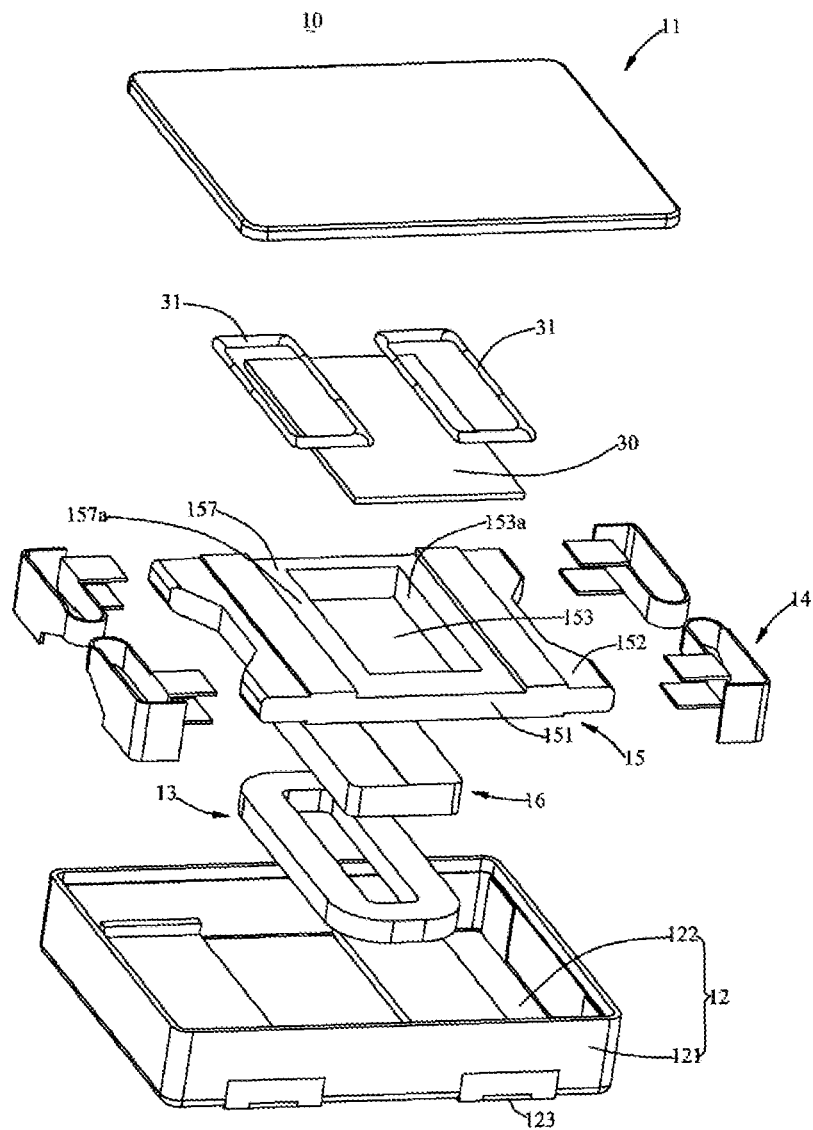
FIG. 2 is an isometric and exploded view of the linear vibrator in FIG. 1.
Figure 3:
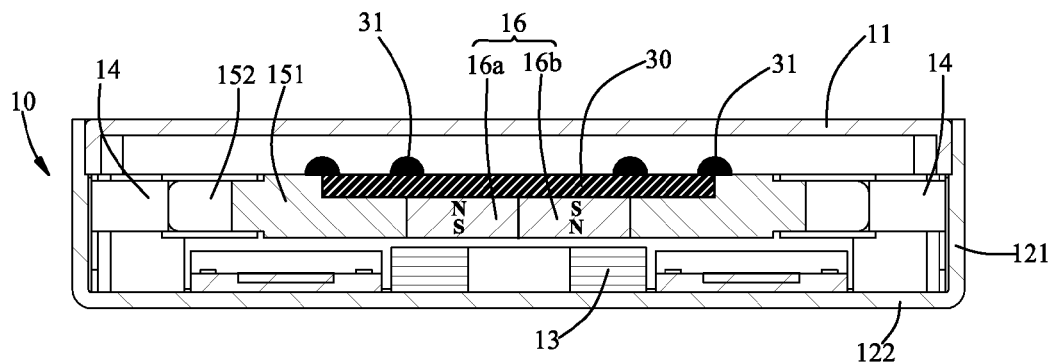
FIG. 3 is a cross-sectional view of the linear vibrator in FIG. 1.

A linear vibrator is mounted on a printed circuit board for generating tactile vibration. Referring to FIGS. 1-3, a linear vibrator 10, in accordance with a first embodiment of the present invention, includes a cover 11, a base 12 forming a receiving space together with the cover 11, an annular coil 13, a plurality of elastic member 14, a weight 15, and a magnet assembly 16. The cover 11 and the base 12 corporately form a housing having the receiving space. The base 12 further defines a bottom wall 122 and a plurality of sidewalls 121 extending vertically from the bottom wall 122. When the vibrator 10 is mounted on the printed circuit board, the bottom wall 122 is attached and parallel to the printed circuit board.

The coil 13 is positioned on the bottom wall 122 and a pair of leads thereof is electrically connected to electrical pads 123 embedded in the bottom wall 122 for receiving current from external circuits. The elastic members 14 are positioned on the base 12, preferably on the sidewalls 121 of the base 12. The weight 15 is suspended in the receiving space by the elastic members 14. The weight 15 includes a main body 151 and a plurality of positioning portions 152 extending from the main body 151. The positioning portions 152 are used for assembling with the elastic members 14. The main body 151 defines a through hole 153 in a middle portion thereof for receiving the magnet assembly 16 therein. The through hole 153 is bounded by an inner surface 153a for engaging the magnet assembly 16. Thus, the magnet assembly 16, together with the weight 15, is suspended in the receiving space by the elastic members 14. In fact, the magnet assembly 16, as a vibrating unit, may be directly connected to the elastic members 14. In addition, if used, the weight can be made from materials having densities higher than 7.8 g/cm$^3$. The vibrator 10 further includes a pole plate 30, and a plurality of magnetic fluids 31. The weight 15 further includes a recess 157 communicating with the through hole 153. The recess 157 has an inner diameter greater than that of the through hole 153. The recess 157 further includes a recess bottom 157a. While assembled, the pole plate 30 is received in the recess 157 and supported by the recess bottom 157a for covering the through hole 153. The magnetic fluids 31 are attracted to the pole plate 30 by the magnetic flux of the magnet assembly 16.

The magnet assembly 16 in the through hole 153 has two halves, in which, one half 16a has magnetic poles opposite to those of the other half 16b, as shown in FIG. 3. Planes of magnetic poles of the magnet assembly 16 are parallel and face to the bottom wall 122 and are also parallel to the coil 13. The magnet assembly 16 is arranged above the coil 13. The coil 13 receives current from external circuit. At one moment, direction of the current passing through the left half of the coil is inward into the paper, and direction of the current passing through the right half of the coil is outward. According to Left-hand rule, direction of the electromagnetic force applied on the left half coil is rightward, and direction of the electromagnetic force applied on the right half coil is also rightward. Thus, the whole coil is given a rightward total electromagnetic force which forces the coil to move rightward. However, the coil is positioned on the bottom wall and can't move by the force. As a result, the weight suspended by the elastic members is forced to move leftward by the reaction force. As direction and intensity of the current passing through the coil is varied, the movement of the weight is leftward or rightward, alternatively, which is called vibration. Direction of the vibration is parallel to the bottom wall.

The magnetic fluid 31 is served as a damper. while dropped down, the vibrating unit thereof may move along a direction perpendicular to the vibrating direction. While dropped down, the damper can prevent the vibrating unit from crashing onto the housing of the vibrator, and further avoid noise or damage of the vibrating unit or the housing. The recess 157 for receiving the pole plate 30 provides the magnetic fluids with sufficient space and protects the magnetic fluids from strong extrusion by the housing during dropping. By virtue of the recess, the magnetic fluids could recover to original position and figuration by the magnetic flux of the magnet assembly. For fully receiving the pole plate in the recess, the depth of the recess is greater than the height of the pole plate. It is optional that part of the magnetic fluid is arranged above the magnet assembly and other part of the magnetic fluid is arranged above the weight.

Figure 4:
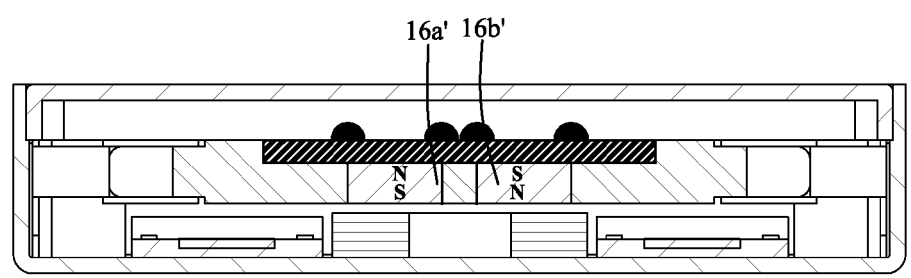
FIG. 4 is a cross-sectional view of a linear vibrator in accordance with another exemplary embodiment of the present disclosure.

FIG. 4 illustrates a linear vibrator in accordance with a second embodiment of the present disclosure. In the linear vibrator, two magnets 16a', 16b' are provided. One of the magnets has magnetic poles opposite to those of another. In fact, it is clearly that the two magnets can be regarded as a magnet assembly. It is optional that part of the magnetic fluid is arranged above the magnets and other part of the magnetic fluid is arranged above the weight.

While the present invention has been described with reference to specific embodiments, the description of the invention is illustrative and is not to be construed as limiting the invention. Various of modifications to the present invention can be made to the exemplary embodiments by those skilled in the art without departing from the true spirit and scope of the invention as defined by the appended claims.

What is claimed is:

1. A linear vibrator, comprising:
    a cover;
    a base forming a housing together with the cover, the base defining a bottom wall and a plurality of sidewalls;
    a plurality of elastic members received in the housing;
    a weight suspended in the housing by the elastic members, the weight including a through hole bounded by an inner surface and a recess communicating with the through hole, the recess including a recess bottom having an inner diameter greater than that of the through hole;
    a magnet assembly positioned by the inner surface of the through hole in the weight;
    a pole plate received in the recess and carried by the recess bottom for covering the through hole;
    magnetic fluids attracted to the pole plate by magnetic flux of the magnet assembly;
    a coil positioned on the bottom wall and located below the magnet.

2. The linear vibrator as described in claim 1, wherein a part of the magnetic fluids is arranged above the magnet, and the other part is arranged above the weight.

3. The linear vibrator as described in claim 1, wherein each of the elastic members includes an elastic arm being deformable parallel to the bottom wall.

4. The linear vibrator as described in claim 1, wherein the magnet assembly has one half having magnetic poles opposite to those of the other half.

5. The linear vibrator as described in claim 1, wherein the magnet assembly includes two magnets, one of the magnets having magnetic poles opposite to those of another.

6. A linear vibrator, comprising:
    a housing including a cover and a base, the base defining a bottom wall and a plurality of sidewalls vertically extending from the bottom wall;
    a plurality of elastic members connected to the housing;
    a vibrating unit suspended by the elastic members, the vibrating unit comprising a magnet assembly and having a recess, the recess having a recess bottom;
    a pole plate received in the recess and supported by the recess bottom, the pole plate contacting with the magnet assembly;
    a damper positioned on the pole plate by magnetic flux of the magnet assembly;
    a coil positioned on the bottom wall and located below the magnet;
    wherein the vibrating unit includes a weight having a through hole therein for engaging with a magnet assembly, and an inner diameter of the recess is greater than that of the through hole.

7. The linear vibrator as described in claim 6, wherein a part of the damper is arranged above the magnet, and the other part is arranged above the weight.

8. The linear vibrator as described in claim 6, wherein the damper is magnetic fluids attracted to the pole plate by magnetic flux of the magnet assembly.

* * * * *